April 3, 1956  J. M. BRADY  2,740,293
VAPORIZING LIQUID METER SYSTEM
Filed Oct. 16, 1952  2 Sheets-Sheet 1

INVENTOR.
JAMES M. BRADY
BY
Harry M. Saragovitz
Attorney

April 3, 1956 J. M. BRADY 2,740,293
VAPORIZING LIQUID METER SYSTEM
Filed Oct. 16, 1952 2 Sheets-Sheet 2

INVENTOR.
JAMES M. BRADY
BY
Harry M. Saragovitz
Attorney

2,740,293

VAPORIZING LIQUID METER SYSTEM

James M. Brady, Wontagh, N. Y., assignor to the United States of America as represented by the Secretary of the Army Application October 16, 1952, Serial No. 315,215

3 Claims. (Cl. 73—171)

(Granted under Title 35, U. S. Code (1952), sec. 266)

This invention relates to a system for measuring liquid. In contrast to prior art systems which physically determine the weight or volume of liquid, the present system measures the quantity and rate of accumulation electrically. When the invention is employed as a rain gage, the quantity of rainfall may be determined by measuring the energy expended in vaporizing precipitation, while the rate of rainfall may be determined by the rate at which such energy is utilized.

Accordingly, an object of the present invention is to provide a novel method and system for measuring liquid, particularly rainfall and the liquid water content of clouds.

A further object of the invention is to provide an electrical method and system for gaging precipitation.

An additional object of the invention is to provide a system which measures the integrated amount and the rate of rainfall by vaporizing the rain and determining the amount of energy expended and the rate of expenditure, respectively.

Another object of the invention is to provide a method and system for measuring electrically the liquid water content of clouds.

A further object is to provide a method and system for analyzing the liquid water content of a gas.

Other objects of the invention will appear from consideration of the following specification in conjunction with the accompanying drawing, wherein.

Figures 2, 3:
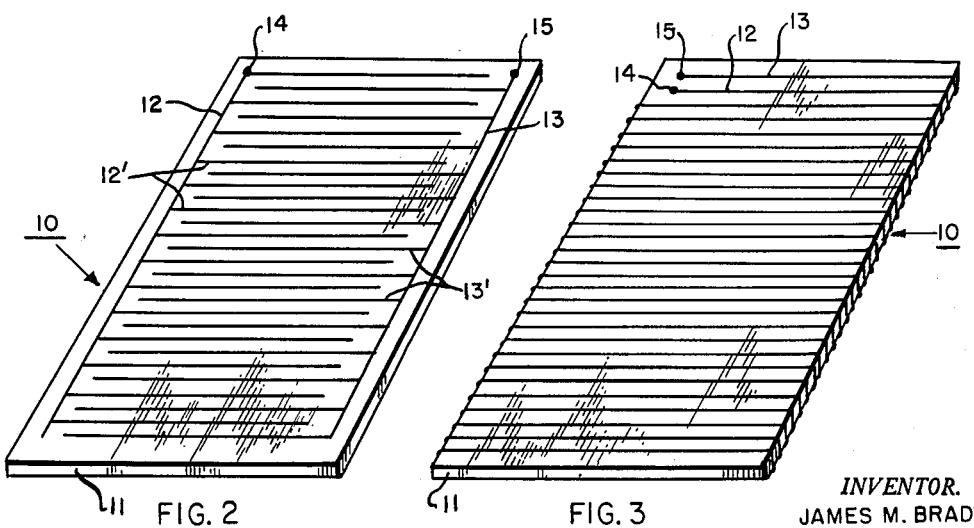
Figs. 2 and 3 are perspective representations of the detector-evaporator unit specifically.

Referring to the drawing, 10 designates a moisture detector-evaporator unit, which comprises an insulating form 11, such as glass, porcelain, Bakelite, or the like, upon an exposed surface of which a system of electrodes is mounted. In Fig. 2 is shown an electrode embodiment which may be termed interdigital. The electrode structure comprises two primary feeders 12, 13 to which electrode elements 12', 13' are respectively connected. It will be observed that the electrodes form an interlaced network of lines, with adjacent lines spaced and insulated from each other. Feeders 12, 13 are coupled to terminals 14, 15, respectively, to which lead-in wires may be connected.

Fig. 3 illustrates another electrode embodiment, wherein feeders 12, 13 are wound upon the form 11 to provide the electrode network. It should be noted that the feeders are insulated from each other throughout their length. The electrode structure of Figs. 2 and 3 may be formed by mounting bare wires on the insulating form 11 or by depositing metal thereon by any of the well known processes. Any suitable metal may be employed, but it may be desirable to utilize a relatively inert metal as will be evident hereinafter.

Figure 1:
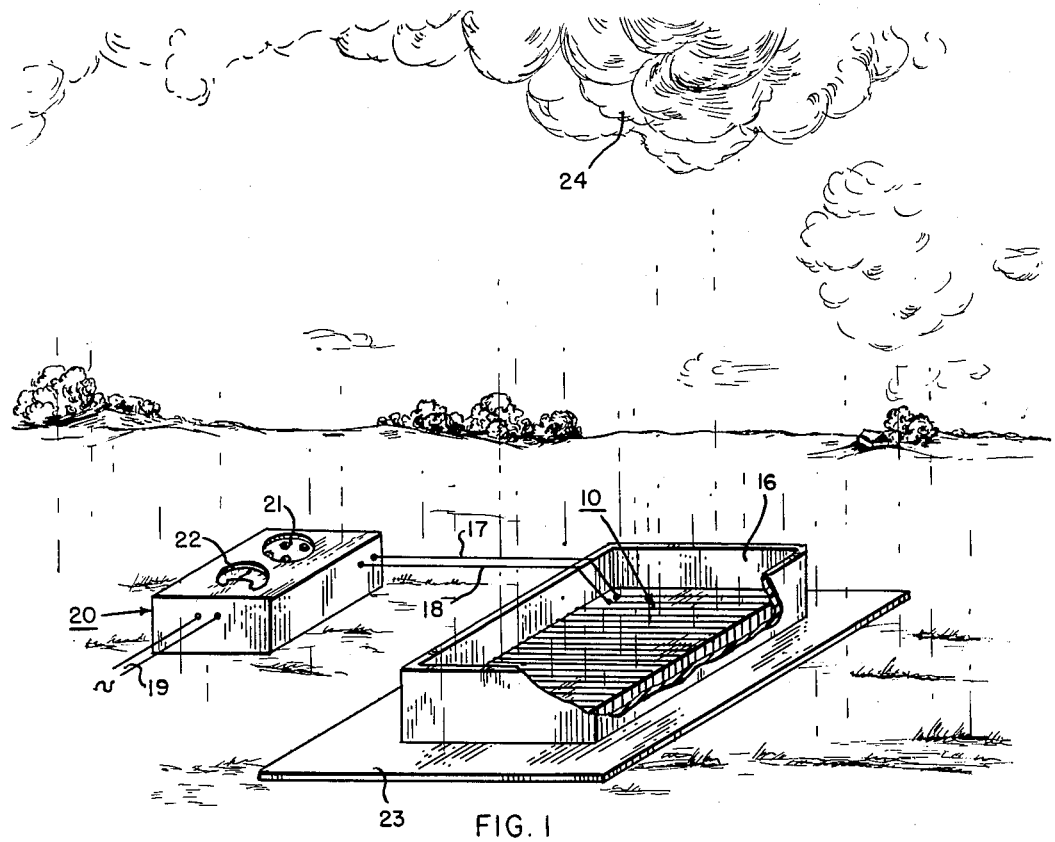
Fig. 1 is a view of the over-all system of the invention employed as a rain gage.

A layer of water-soluble salt, such as lithium chloride, is applied to the electrode structure and the adjacent surface of the form 11. The assembled detector-evaporator unit is placed in a low vessel 16 as shown in Fig. 1, and lead-in wires 17, 18 are connected to the terminals 14, 15 and to a source of alternating current 19, which may be a standard 110 volt supply. Interposed in the lead-in circuit is a conventional metering device 20 designed to indicate watt-hours on a scale 21, and also watts on a scale 22, if desired. Detector-evaporator unit 10 may be mounted on a splash preventing mat 23, which may be composed of ordinary cocoa mat material.

In operation, the vessel 16 containing the detector-evaporator unit 10 is supported on a flat surface contiguous to the ground and is exposed to rainfall, as from the cloud 24. Rain falling upon the detector-evaporator unit causes the salt coating to ionize and thereby form a conductive connection between the wires 12, 13, which are in turn coupled to the wires 17, 18. Current from the alternating current supply 19 flows through the circuit thus constituted and generates heat, which rapidly vaporizes the rain.

It is evident that current will flow as long as there is rain to provide a conductive path between the wires 12, 13 and will terminate when the rainfall ceases. The use of alternating current prevents polarization of the salt solution.

Because the vessel 16 offers very little wind resistance, wind eddy currents, which might blow the rain past the unit are minimized. The surrounding mat 23 prevents rain falling on adjacent areas from splashing into the vessel. In addition, the walls of the vessel 12 should be high enough to contain any rain which might splash off of the unit 10, or alternatively the form 11 may be so designed or composed as to minimize splashing.

The following computation illustrates that the energy expended in vaporizing the rain, and the rate at which such energy is expended are a measure of the quantity of rainfall and the rate of rainfall respectively.

Calories
Heat of vaporization of 1 cc. of water at $100°$ C__ =540
Heat to bring 1 cc. of water to boiling from $20°$ C_ = 80

Total heat to vaporize 1 cc. of water_____ =620

Volume of rain in cc. to be vaporized=inches of rain$\times 2.54 \times$area of detector-evaporator unit in sq. cm.

Assuming 10 inches of rain and 100 sq. cm. of area, volume to be vaporized=2540 cc.

Heat to vaporize=$2540 \times 620 = 1.57 \times 10^6$ calories 1 kwh.=$8.6 \times 10^5$ calories Therefore, 10 inches of rain=1.8 kwh. or 1.8 kw.=10 inches of rain per hour.

Since an initial temperature of $20°$ C. was assumed it is evident that some correction must be made in the above calculation if the actual rain temperature deviates from $20°$ C. However, the computation is adequate to illustrate that the watt-hour meter and the watt meter may be calibrated to indicate quantity of rainfall and rate of rainfall for various temperatures. It is further evident that slight errors may be introduced because of heat removed by conduction, convection, and radiation. The convection error is minimized if the apparatus is placed closed to the ground, since skin friction will cause the wind velocity to be very small and the heat removed will be minimized. Allowance may be made for errors of the type indicated, in calibrating the meters.

The elements shown and described are merely illustrative of the principles of the invention, and various modifications will be obvious to those skilled in the art. For example, the metering apparatus and the detector-evaporator unit may be located at remote points and coupled by wire or radio. The shaft rotation of the watt-hour meter is particularly adapted to telemetering. The detector-evaporator unit may assume any appropriate configuration, but the electrode structure must be designed to provide adequate heat capacity and to withstand the rigors of operation under the voltage applied and the electrolytic action. The physical design of the vessel 16 is not important, as long as it fulfills its purpose of collecting rain from a representative area and of supporting the detector-evaporator unit. Moreover, the exact nature of the metering apparatus is not critical and the meter may comprise any device suitable for measuring the quantity of electrical energy and/or the rate at which such energy is utilized. The invention is not limited to rainfall measurement and may be utilized to measure any liquid which conducts or can be made to conduct electricity.

Figure 4:
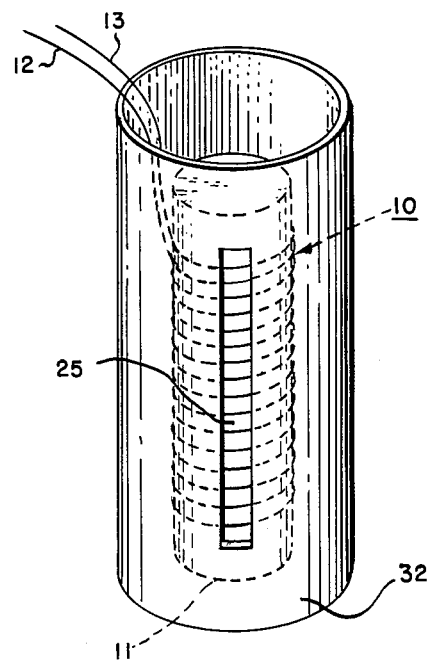
Fig. 4 is a perspective view of the detector-evaporator adopted for use in a cloud testing embodiment.
Figure 5:
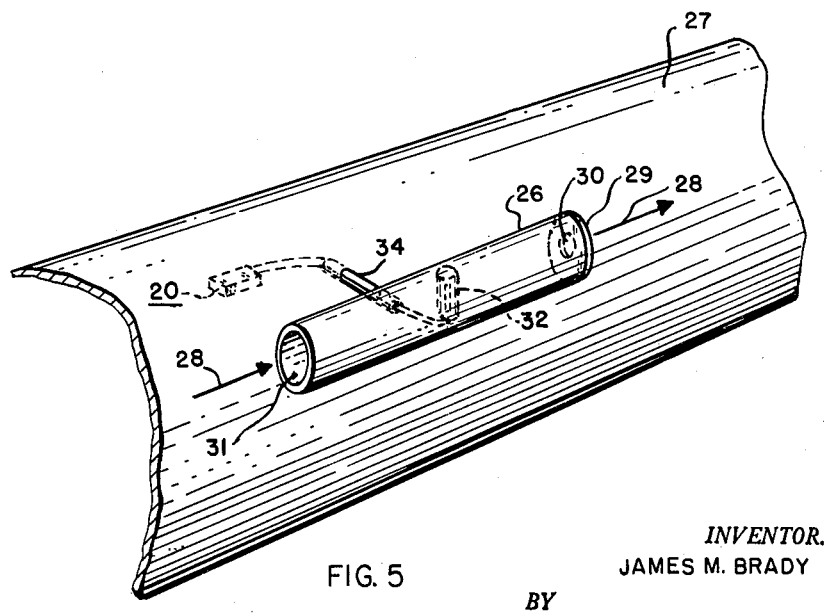
Fig. 5 is a view, partly in section, of the cloud testing system.

The apparatus shown in Fig. 4 is especially designed for the measurement of liquid water in clouds. The insulating base 11 may take the form of a cylinder upon which feeder-electrode wires 12, 13 are wound and the salt coating is applied. A shield 32 of any suitable material and provided with a longitudinal slot 25, encompasses the unit 10. Feeder wires 12, 13 are connected to appropriate measuring apparatus as in Fig. 1. In operation, the unit shown in Fig. 4 is best utilized, as indicated in Fig. 5, by placing it in a diffuser or decelerator 26, which is mounted on the exterior of an aircraft fuselage 27 parallel to the air stream 28. The diffuser is well known in the art and merely comprises a length of pipe having a frontal opening 31 and having a cap 29 on the rear end with a central aperture 30. The size of this aperture determines the velocity of the air which passes by the detector. The slot 25 which is oriented substantially perpendicular to the axis of the diffuser allows moisture-laden air to impinge upon a small area near the leading edge of the detector 10, and thus prevents splashing of water from the detector. The measuring apparatus 20 is installed in the interior of the aircraft 27 and is coupled to the detector unit by the wires 12, 13 which may pass through a pipe 34 connecting the diffuser to the interior of the plane.

Prior to actual measurements the system above described may be suitably calibrated on the ground by passing air of known liquid water content and of known velocity through the diffuser. When the system is actually utilized to measure the liquid water content of clouds, the aircraft traverses the clouds to be tested, whereby liquid water passes through the slot 25, impinges upon the detector-evaporator unit 10, and is evaporated as explained in connection with Fig. 1. The evaporated water passes through the rear of the diffuser. By measuring the air speed the readings on the metering device may be interpreted in terms of water content.

As explained in connection with the rain gage embodiment of Fig. 1, the cloud testing system may have various modifications, which will appear evident to those skilled in the art. The embodiment disclosed is merely illustrative of the principles of the invention. For example, it may be desired to differentiate drop size. This may be accomplished by providing a streamlined housing having a frontal slot, through which moisture-laden air may pass, and a rear exhaust aperture. Joining the openings is a tortuous conduit having consecutive curves decreasing in radius of curvature and having several reversals in direction. Water droplets traveling through the conduit selectively centrifuge according to their drop size into chambers leading from the conduit. Detector-evaporators of the type illustrated in Fig. 4 may be utilized in each of the chambers to measure the quantity of water present.

In another modification, the detector-evaporator unit may be coupled to conventional radiosonde apparatus carried by balloon or parachute. The radiosonde may be designed to produce a signal having a frequency dependent upon the energy expended in evaporation. Thus, the unit may be utilized to measure the vertical extent of cloud formations. It is evident that the invention is not limited to meteorological applications, but may be employed whenever it is necessary to determine liquid water content of gas.

The invention described herein may be manufactured or used by or for the Government of the United States for governmental purposes, without payment to me of any royalty thereon.

What I claim is:

1. In a meteorological apparatus for measuring rainfall, a shallow vessel for collecting rainfall, an insulating member at the bottom of said vessel upon which are mounted spaced wires, a coating of water-soluble salt overlaying said wires and said insulating member, means for coupling adjacent wires to opposite terminals of an alternating current supply, and means for measuring electrical energy expended to vaporize the collected rainfall in said vessel.

2. A liquid water content analyzer comprising an insulating form, a series of bi-filar convolutions on said form, a layer of water-soluble salt on said convolutions and said form, a shield having a slot therein, said shield substantially encompassing said form, a source of alternating current, an energy-measuring device, means for coupling adjacent wires of said convolutions to opposite terminals of said source of current and to said energy-measuring device, and means for directing moisture-laden gas upon said detector through said slot, whereby said moisture is evaporated and said energy-measuring device gives an indication of water content.

3. A system for measuring liquid, comprising a source of alternating current, a series of electrodes, adjacent electrodes being connected to opposite terminals of said source, a soluble salt bridging the space between said electrodes, means for directing liquid to impinge upon said electrode network, whereby said soluble salt is ionized, heat is generated, and said liquid is evaporated, and means for measuring the amount of energy expended in evaporating said liquid.

References Cited in the file of this patent

UNITED STATES PATENTS

| | | |
|---|---|---|
| 1,236,381 | Rogers | Aug. 7, 1917 |
| 2,009,760 | Brown et al. | July 30, 1935 |
| 2,318,646 | White | May 11, 1943 |
| 2,424,735 | Boothroyd | July 29, 1947 |
| 2,563,341 | Kettering | Aug. 7, 1951 |